US012183476B2

(12) United States Patent
Shilton et al.

(10) Patent No.: US 12,183,476 B2
(45) **Date of Patent: *Dec. 31, 2024**

(54) LOW DENSITY IRIDIUM AND LOW DENSITY STACKS OF IRIDIUM DISKS

(71) Applicants: Mark G. Shilton, Chelmsford, MA (US); Mark W. Vose, Windham, NH (US); QSA Global, Inc., Burlington, MA (US)

(72) Inventors: Mark G. Shilton, Chelmsford, MA (US); Mark W. Vose, Windham, NH (US)

(73) Assignee: QSA GLOBAL, INC, Burlington, MA (US)

( * ) Notice: Subject to any disclaimer, the term of this patent is extended or adjusted under 35 U.S.C. 154(b) by 657 days.

This patent is subject to a terminal disclaimer.

(21) Appl. No.: 17/419,371

(22) PCT Filed: Feb. 11, 2020

(86) PCT No.: PCT/US2020/017601

§ 371 (c)(1),
(2) Date: Jun. 29, 2021

(87) PCT Pub. No.: WO2020/167716

PCT Pub. Date: Aug. 20, 2020

(65) Prior Publication Data

US 2022/0076856 A1 Mar. 10, 2022

Related U.S. Application Data

(60) Provisional application No. 62/803,713, filed on Feb. 11, 2019.

(51) Int. Cl.
*G21G 4/06* (2006.01)

(52) U.S. Cl.
CPC .................................... *G21G 4/06* (2013.01)

(58) Field of Classification Search
CPC ... G21G 4/06; G21G 4/08; G21G 4/04; A61B 6/40; B33Y 80/00
See application file for complete search history.

(56) References Cited

U.S. PATENT DOCUMENTS 4,861,520 A 8/1989 Van't Hooft et al.
5,395,300 A 3/1995 Liprie
(Continued)

FOREIGN PATENT DOCUMENTS

CA 1080371 6/1980
CN 1284650 2/2001
(Continued)

OTHER PUBLICATIONS

International Search report issued in PCT/US2020/017601 on Jul. 17, 2020.
(Continued)

*Primary Examiner* — Andrew J. Oyer
(74) *Attorney, Agent, or Firm* — McCarter & English, LLP

(57) ABSTRACT

The disclosure pertains to improvements in a gamma radiation source, typically containing low-density alloys or compounds or composites of iridium in mechanically deformable and compressible configurations, within an encapsulation, and methods of manufacture thereof.

5 Claims, 15 Drawing Sheets

(56) References Cited

U.S. PATENT DOCUMENTS

| | | | | |
|---|---|---|---|---|
| 6,547,816 | B1 | 4/2003 | O'Foghludha | |
| 6,627,908 | B1 | 9/2003 | Han et al. | |
| 8,357,316 | B2 | 1/2013 | Munro, III et al. | |
| 9,812,090 | B2 | 11/2017 | Lim et al. | |
| 10,471,698 | B2 | 11/2019 | Prasad et al. | |
| 2003/0149329 | A1 | 8/2003 | O'Foghludha | |
| 2007/0081940 | A1 | 4/2007 | O'Foghludha | |
| 2017/0084357 | A1* | 3/2017 | Shilton | G21G 4/06 |
| 2020/0027621 | A1 | 1/2020 | Shilton | |

FOREIGN PATENT DOCUMENTS

| | | | |
|---|---|---|---|
| CN | 1358316 | 7/2002 | |
| CN | 1854721 | 11/2006 | |
| CN | 103547311 | 1/2014 | |
| DE | 2644295 | 4/1978 | |
| DE | 19824689 | 10/1999 | |
| ES | 335079 | 3/1968 | |
| GB | 817895 | 8/1959 | |
| GB | 886089 | 1/1962 | |
| KR | 101179653 | 9/2012 | |
| TW | 201319073 | 5/2013 | |
| WO | 2004109716 | 12/2004 | |
| WO | 2005049139 | 6/2005 | |
| WO | 2012178149 | 12/2012 | |
| WO | 2015/175326 | 11/2015 | |
| WO | 2017/205202 | 11/2017 | |
| WO | 2018/084929 | 5/2018 | |
| WO | WO-2018084929 A1 * | 5/2018 | C01G 55/00 |
| WO | 2019/246073 | 12/2019 | |

OTHER PUBLICATIONS

Zhijian Cao, "Development of 192Iry Photographic Souce", Mar. 31, 1987, vol. 21, No. 2, Atomic Energy Science and Technology.

Hui Peng, "Study on Neutron Irradiation Properties of Iridium Alloys", Jul. 31, 2011, No. 00, Annual Report of China Institute of Atomic Energy.

Joohan Kim, "IR Laser Flip-Chip Bonding", Dec. 31, 2007, 2007 International Conference on Control Automation and Systems.

Pinjing Cheng, "Calculation of Dose Distribution of High Dose Rate Iridium-192 Microsource in Water Model", Nov. 20, 2007, No. 6, Nuclear Electronics and Detection Technology.

Zhijian Cao, "Development of 192Iry Photographic Source", Mar. 31, 1987, vol. 21, No. 2, Atomic Energy Science and Technology.

Communication issued in Application No. 20711379.6-1212, on Mar. 12, 2024.

Office Action issued in Korean Application No. 520020222776 on Jun. 17, 2024.

* cited by examiner

FIG. 7A
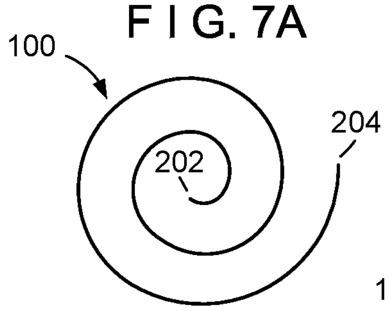
FIG. 7B
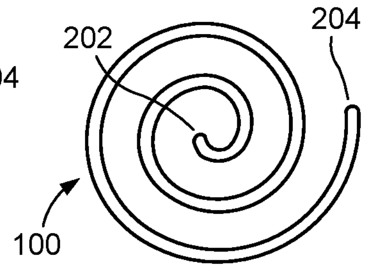
FIG. 7C
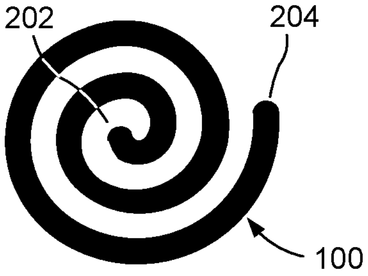
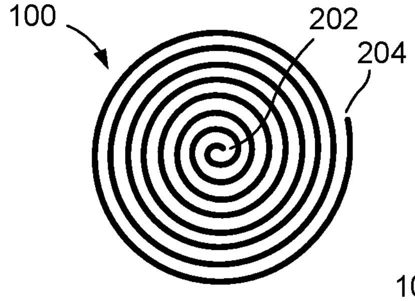
FIG. 7D
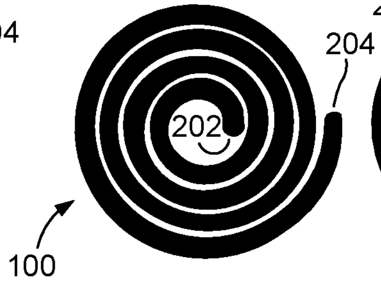
FIG. 7E
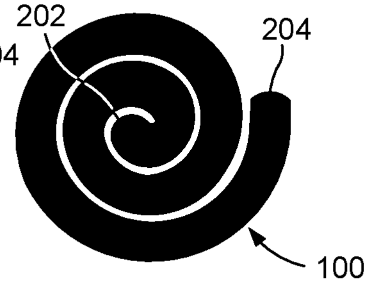
FIG. 7F
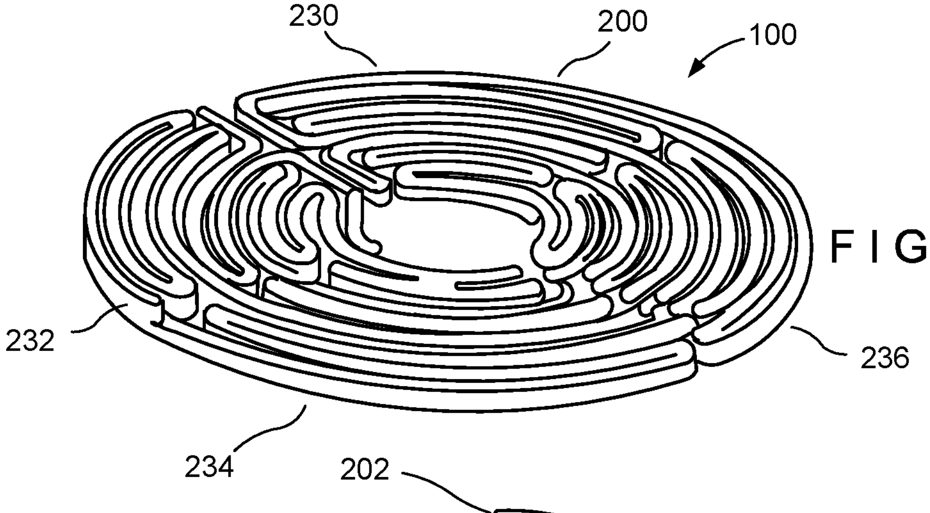
FIG. 7G
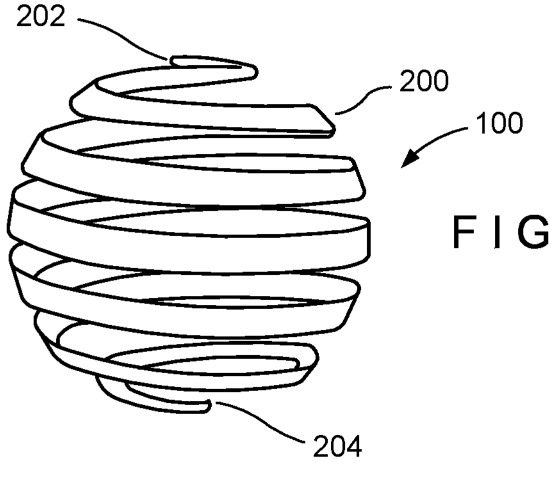
FIG. 7H

LOW DENSITY IRIDIUM AND LOW DENSITY STACKS OF IRIDIUM DISKS

RELATED APPLICATION

This application is a national phase of International Application No. PCT/US2020/017601 filed on Feb. 11, 2020, and claims priority to U.S. Provisional Application No. 62/803,713, filed Feb. 11, 2019, the contents of which is hereby incorporated by reference in its entirety and for all purposes.

FIELD OF THE DISCLOSURE

A first aspect of this disclosure pertains to improvements in a gamma radiation source, typically containing low-density alloys or compounds or composites of iridium in mechanically deformable and compressible configurations, for use within an encapsulation, and methods of manufacture thereof. A second aspect of this disclosure further pertains to stacks of iridium disks, wherein the disks have a relatively thicker center and a relatively thinner edge, thereby resulting in a reduced stacking density.

DESCRIPTION OF THE PRIOR ART

Improvements in iridium sources have been described in PCT/US2017/033508 entitled "Low Density Spherical Iridium"; PCT/US2017/050425 entitled "Low Density Porous Iridium"; PCT/US2015/029806 entitled "Device and Method for Enhanced Iridium Gamma Irradiation Sources" and PCT/US2019/037697 entitled "Low Density Iridium." The disclosures of these applications are well-suited to their intended purposes. However, further improvements and refinements are sought.

OBJECTS AND SUMMARY OF THE DISCLOSURE

It is therefore an object of this application to provide improvements and refinement with respect to the above-identified prior art.

Objects of a first aspect of this disclosure include:

1. developing a deformable and/or compressible low density iridium alloy containing 30-85% (volume percentage) Iridium, preferably in the range of 30-70%, more preferably in the range of 40-60%.
2. the alloying constituents ideally or typically should not irradiate to produce other radionuclides that generate interfering gamma rays.
3. the alloying constituents ideally or typically should not have excessively high density or high neutron activation cross-section, which could decrease the activation yield or decrease the source-output yield of Iridium-192.
4. the alloying constituents ideally or typically should produce an alloy that is workable in that the alloy needs to be sufficiently ductile/deformable/compressible whereas pure iridium and most of its alloys are brittle and unworkable; the alloy ideally or typically should preferably have a lower melting point than pure iridium (a melting point less than 2000 degrees Centigrade would be desirable to lower processing costs and simplify thermal technologies); and the alloy ideally or typically should be substantially physicochemically inert (i.e., it does not oxidize/corrode/decompose under conditions of manufacture or use).

Objects of a second aspect of this disclosure include:

1. Using shaped disks, with a relatively thicker center and a relatively thinner circumference or periphery of pure 100 percent dense iridium to achieve a low effective density of a disk stack and/or spherical or quasi-spherical focal shapes.
2. While the disks are envisioned to be constructed of 100 percent dense iridium, the stacking density of a disk stack may be approximately 60 percent. A typical range for this could be 50-70% depending on the amount of compression or deformation of the stack and the final shape that is desired.
3. The disk stack could be compressed after activation and stacking to form a quasi-spherical shape using shaped die plungers or a shaped capsule cavity. Such compression would reduce the focal dimension from cylindrical to quasi-spherical shape.
4. Compression or deformation to produce a more spherical shape increases the stack density, but the highest specific activity Ir-192 in the disks is expected to be in the circumference where the disks are thinnest and where neutron activation is most efficient, hence densification is not expected to unduly decrease emission efficiency.

BRIEF DESCRIPTION OF THE DRAWINGS

Further objects and advantages of the disclosure will become apparent from the following description and from the accompanying drawings, wherein:

FIGS. 7A-7H disclose further embodiments of compressible disks of the present disclosure.

DETAILED DESCRIPTION OF THE PREFERRED EMBODIMENTS

In accordance with the above, the alloy $Ir_2MnAl$ forms an embodiment of the present disclosure of a gamma radiation source. It is believed to have ductile properties similar to steel. Additionally, manganese and aluminum are not expected to generate interfering gamma rays after irradiation.

This alloy or similar alloys (such as with ternary additions of other non-activating elements or radioactive decay or activation products including osmium and platinum) is expected have suitable mechanical properties to make deformable and/or compressible thin disks, which can be stacked like conventional Iridium-192 sources and then deformed to produce a quasi-spherical Iridium-192 insert. Although the addition of manganese slightly increases the density with respect to iridium plus aluminum or iridium plus aluminum plus Boron-11, it is expected that the metallurgical properties of $Ir_2MnAl$ may offer significant processing advantages.

A typical thin stackable disk may have a thickness in the range of 0.1-1.0 mm, typically inversely related to density. A 30 percent density alloy disk may have a thickness of 1.0 mm before compression. A 10 percent density alloy disk (such as may be achieved in a macroporous or metal foam embodiment) may have a thickness as much as 2.0-3.0 mm before compression.

Iridium manganese copper alloys are also of interest. These alloys are expected to be ductile and have a melting point significantly below 2000 degrees Centigrade and potentially as low as 1300 degrees Centigrade, depending upon the alloy composition after irradiation. These alloys are disclosed in U.S. Pat. No. 4,406,693 entitled "Method for Refilling Contaminated Iridium," issued on Sep. 27, 1983. However, it is expected that aluminum will be preferable over copper as a tertiary alloying element in most applications.

Furthermore, reduced density may be achieved in some embodiments by the use of porous, microporous or macroporous (i.e., metal foam) forms of the alloy of choice.

All radiation sources are typically designed and expected to be inserted into an encapsulation.

Figure 1:
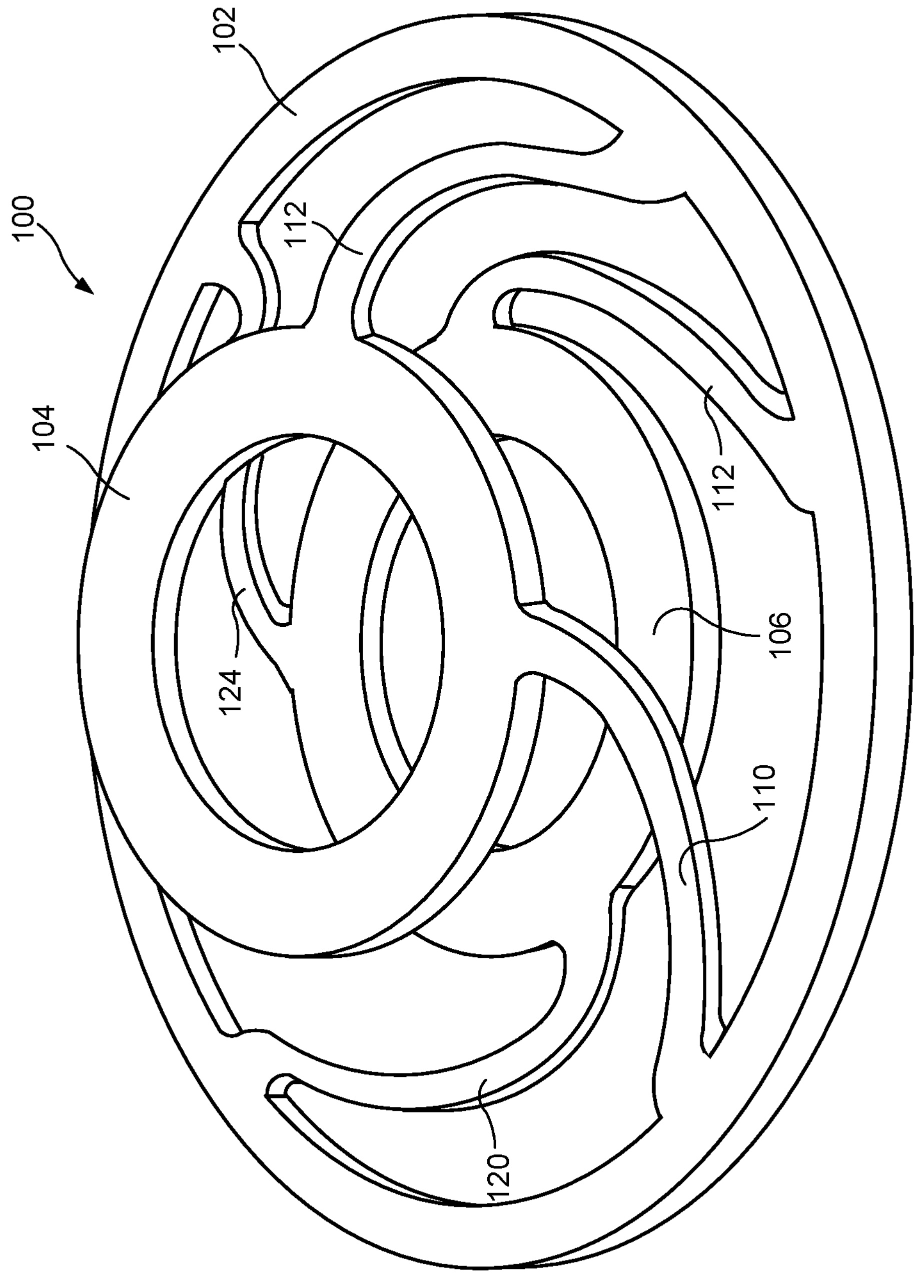
FIG. 1 is a perspective drawing of an embodiment of a deformable and compressible disk using a deformable compressible iridium alloy of the present disclosure.
Figure 4:
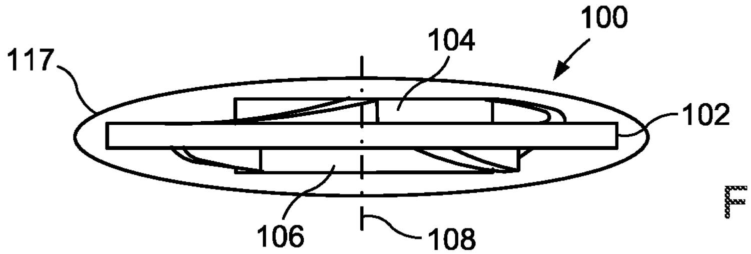
FIG. 4 is a side view of the compressible disk of FIG. 1, after compression, within a sealed encapsulation.
Figure 3:
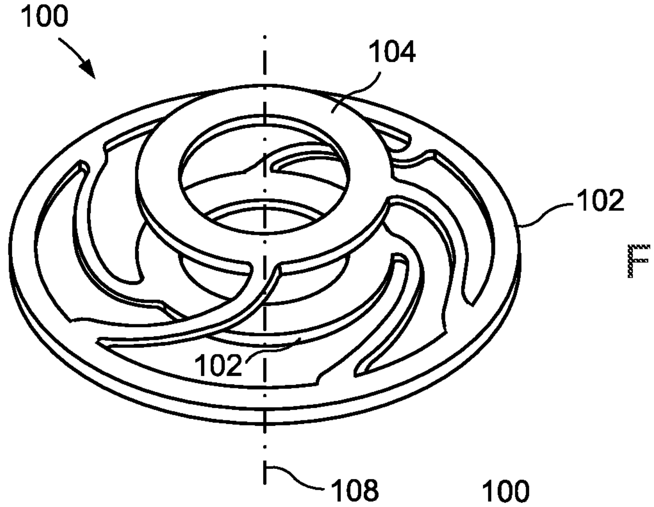
FIG. 3 is a perspective view of the compressible disk of FIG. 1.
Figure 2:
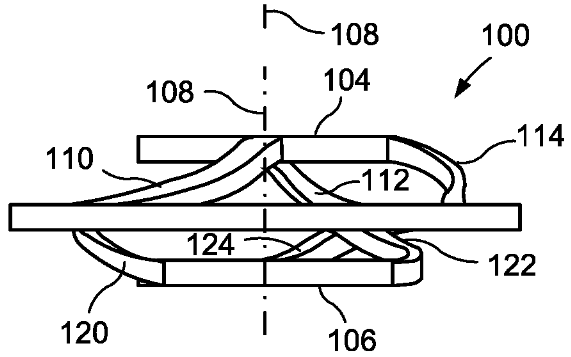
FIG. 2 is a side view of the compressible disk of FIG. 1.

Referring now to FIGS. 1 through 4, one sees illustrations of an embodiment of a deformable/compressible non-solid shape for a gamma radiation source 100 (which may be a radiological or radiographic source) that may be made using a deformable/compressible iridium alloy. Gamma radiation source 100 may be manufactured by 3-D printing but is not limited thereto. Further, gamma radiation source 100, as well as all embodiments disclosed herein, are implemented within a sealed encapsulation. Gamma radiation source 100 of FIGS. 1-4 includes a central ring or disk 102, along with upper and lower rings or disks 104, 106 of somewhat reduced diameter. Rings 102, 104, 106 generally share a common rotational axis 108, as shown in FIGS. 2-4, and are generally parallel to each other in an uncompressed or uniformly compressed configuration. Upper ring 104 is positioned above the central ring 102 by arms 110, 112, 114 spiraling rotationally outwardly from an exterior circumferential surface of upper ring 104 to an interior circumferential surface of central ring 102. Similarly, lower ring 106 is positioned below the central ring 102 by arms 120, 122, 124 spiraling rotationally outwardly from an exterior circumferential surface of lower ring 106 to an interior circumferential surface of central ring 102. The elasticity and flexibility of spiraling arms 110, 112, 114, 120, 122, 124 allows for forces generally parallel with the rotational axis 108 to compress the gamma radiation source 100 from the configuration shown in FIGS. 1 and 2 to the configuration shown in FIG. 4. Furthermore, in the compressed configuration of FIG. 4, gamma radiation source 100 is sealed within a encapsulation 117. Those skilled in the art will recognize that different shapes and configurations of encapsulation may be used for different applications, and that shapes different from that of the illustrated encapsulation may be used.

Figure 5A:
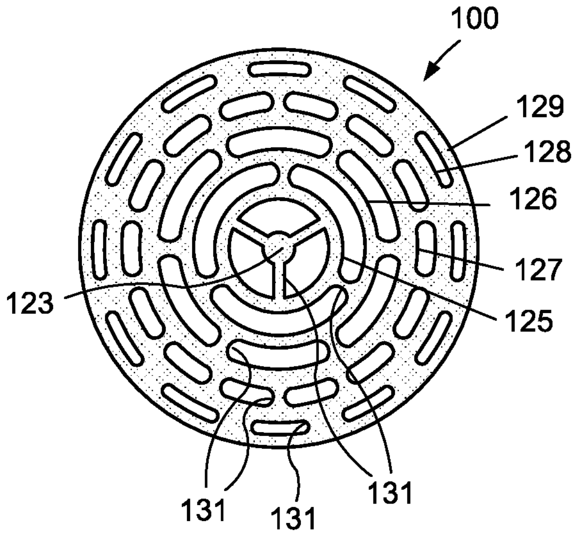
FIGS. 5A and 5B are a front plan view and a side plan view of a further embodiment of the compressible disk of the present disclosure.
Figure 5B:
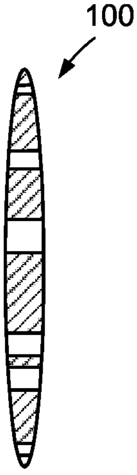
Figures 6A, 6B, 6C, 6D, 6E:
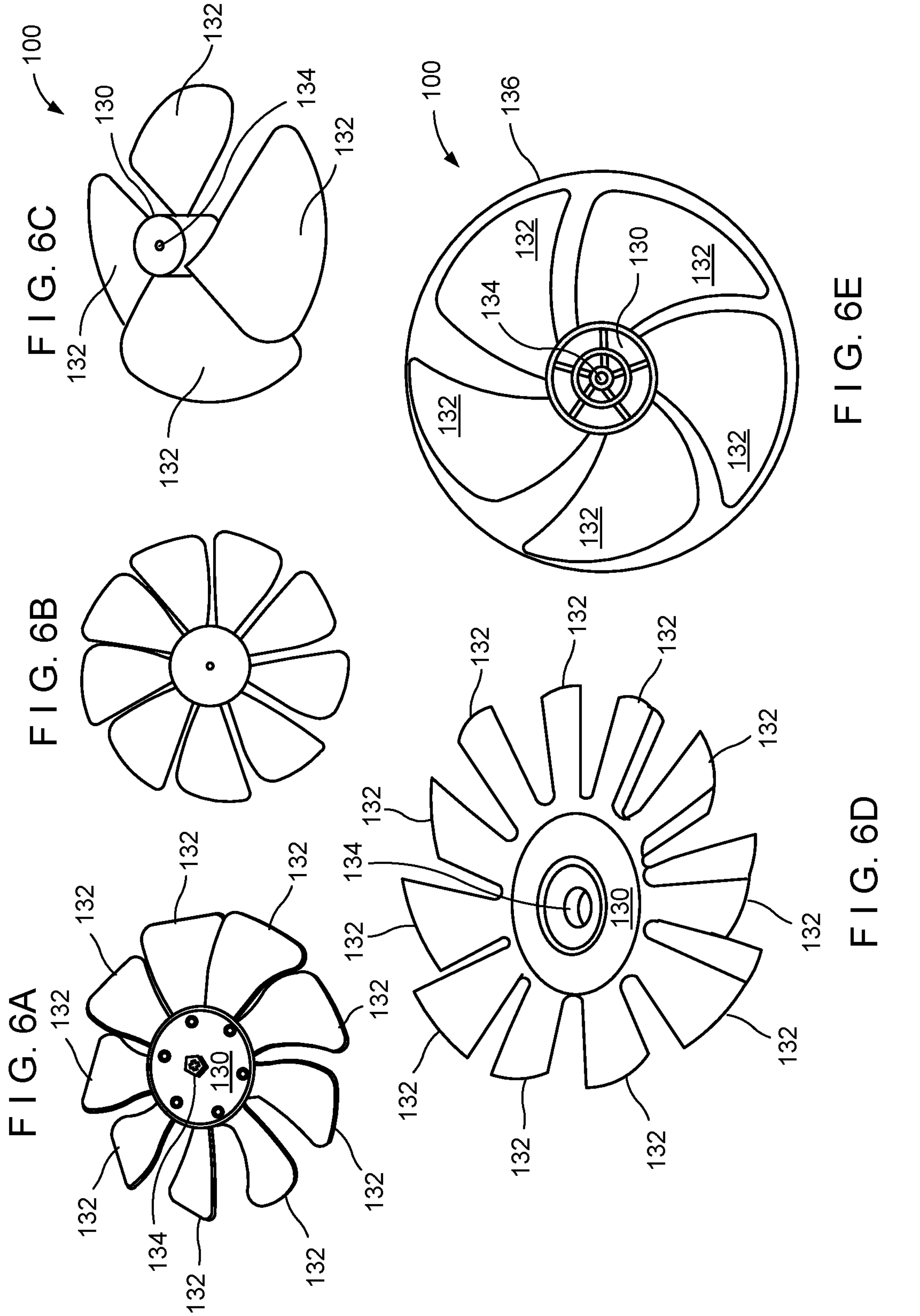
FIGS. 6A-6E are front plan views of fan-blade type embodiments of the present disclosure.

FIGS. 5A and 5B illustrate an embodiment of gamma radiation source 100 wherein concentric co-planar rings 125, 126, 127, 128, 129 of deformable/compressible iridium alloy area positioned around a center 123, with radial structural spoke segments 131 extending from center 123 to innermost ring 125, and then between successively or sequentially concentrically adjacent rings, 125, 126; 126, 127; 127, 128; and 128, 129. FIG. 5B illustrates the elongated shape of the side view of gamma radiation source 100. The resulting configuration can be folded and/or compressed into different shapes to achieve an increased average density. This gamma radiation source 100 is made from a deformable/compressible iridium alloy, may be made by 3-D printing, and is sealed within an encapsulation (see FIG. 4, element 117).

FIG. 6A-6E illustrate embodiments of the gamma radiation source 100 which include a central cylindrical shaft-type hub area 130 with a rotational axis 134 at the center and with propeller-type radial extensions 132 extending therefrom. Additionally, FIG. 6E includes an outer circular ring 136 joining the distal ends of the propeller-type radial extensions 132. These propeller type radial extensions 132, in the illustrated uncompressed states, are oriented at an angle analogous to the pitch or blade angle of a conventional propeller. While different applications may use different angles, a typical pitch or propeller angle may be in the range of 30 to 60 degrees. However, as a result of forces of compression generally parallel to the rotational axis 134, the propeller angle of the propeller-type radial extensions 132 reduces so that the angle between the planar surface of the central cylindrical shaft-type hub area 130 and the propeller-type radial extensions 132 reduces so that the propeller-type radial extensions 132 approach a planar configuration with the central cylindrical shaft-type hub area 130. This decreases the volume which generally envelopes the gamma radiation source 100, thereby increasing the average density within the volume. These gamma radiation sources 100 are made from a deformable/compressible iridium alloy, may be made by 3-D printing, and are sealed within an encapsulation (see FIG. 4, element 117).

FIGS. 7A-7F illustrate spiral configurations of the gamma radiation source 100 comprising a rod, tube or other extended configuration 200 of deformable iridium alloy, or similar material. Rod, tube or other extended configuration 200 includes a first end 202 and a second end 204. The spiral configuration places first end 202 at an interior location in the spiral and the second end 204 at an exterior location in the spiral. The spiral configuration, along with the deformable, and possibly elastic, property of the rod, tube or other extended configuration 200 allows the spiral to be tightened so as to occupy less volume, and therefore have a higher average density. In many applications, these shapes are adaptable to 3-D printing.

FIG. 7G illustrates an embodiment of gamma radiation source 100 wherein a rod, tube or other extended configuration 200 of deformable iridium alloy or similar material is successively looped and placed at increasing radial locations, within each of four quadrants 230, 232, 234, 236. As shown in FIG. 7G, alternate loops may extend between two adjacent quadrants. The resulting structure can be stretched or compressed within the plane of gamma radiation source 100 or folded upon itself to alter the average density of the gamma radiation source 100. In many applications, this shape is adaptable to 3-D printing.

FIG. 7H illustrates an embodiment of gamma radiation source 100 wherein a rod, tube or other extended configuration 200 of deformable iridium alloy or similar material is wrapped in a three-dimensional spiral shape so as to form a quasi-spherical shape in that the rod, tube or other extended configuration 200 covers a first portion of a quasi-spherical shape and a second portion of a quasi-spherical shape is left open, with ends 202, 204 generally at opposite poles of the quasi-spherical shape. The resulting three-dimensional spiral shape of the gamma radiation source 100 can be twisted or otherwise compressed into a configuration of increased average density. In many applications, this shape is adaptable to 3-D printing.

Figures 8A, 8B, 8C, 8D, 8E, 8F, 8G:
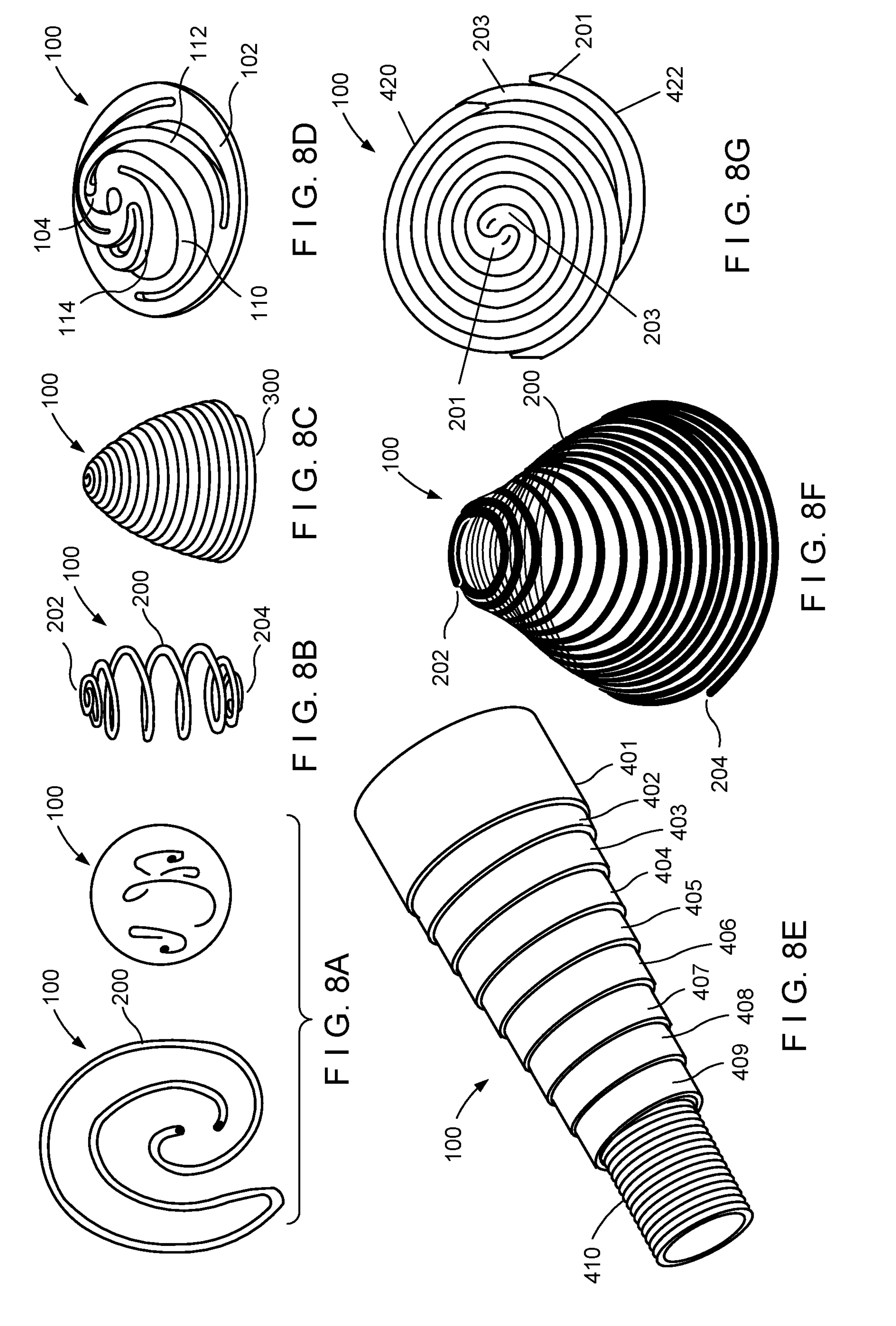
FIGS. 8A-8G disclose still further embodiments of compressible disks of the present disclosure.

FIGS. 8A-8G illustrate further embodiments of the gamma radiation source 100 of the present disclosure. FIG. 8A illustrates how a rod, tube or other extended configuration 200 of deformable iridium alloy or similar material may be wrapped or looped within a single plane. This gamma radiation source 100 may be twisted or compressed into a configuration of increased average density. In many applications, this shape is adapted to 3-D printing.

FIG. 8B illustrates an embodiment of a gamma radiation source 100 similar to that of FIG. 7H. A rod, tube or other extended configuration 200 of deformable iridium alloy or similar material is wrapped in a three-dimensional spiral shape so as to form a quasi-ellipsoidal shape in that the rod, tube or other extended configuration 200 covers a first portion of a quasi-ellipsoidal shape and a second portion of a quasi-ellipsoidal shape is left open, with ends 202, 204 generally at opposite poles of the quasi-ellipsoidal shape. The resulting three-dimensional spiral shape of the gamma radiation source 100 can be twisted or otherwise compressed into a configuration of increased average density. In many applications, this shape is adaptable to 3-D printing.

FIG. 8C illustrates an embodiment of the gamma radiation source 100 wherein a ribbon-like configuration 300 of deformable iridium alloy or similar material is wrapped in a three-dimensional projectile or nosecone-type shape. This shape may be pushed downward to form a tightly wrapped spiral configuration of increased average density. In many applications, this shape is adaptable to 3-D printing.

FIG. 8D illustrates an embodiment of gamma radiation source 100 similar to that of FIGS. 1-4. In FIG. 8D, a relatively larger ring 102 is provided with, along with a relatively smaller ring 104 in an upward position. Rings 102, 104 generally share a common rotational axis 108. Ring 104 is positioned above the ring 102 by arms 110, 112, 114 spiraling outwardly from an exterior circumferential surface of ring 104 to an interior circumferential surface of ring 102. The elasticity and flexibility of arms 110, 112, 114 allows for forces generally parallel with the rotational axis to compress the gamma radiation source 100. In many applications, this shape is adaptable to 3-D printing.

FIG. 8E illustrates an embodiment of gamma radiation source 100 which includes a series of interlocking sleeves 401-409 which are slidably engaged with inwardly or outwardly adjacent interlock sleeves. Interlocking sleeves 401-409, which are formed of a deformable iridium alloy or similar material may also be implemented as a spiral configuration of a single sheet of material. A spiral wire configuration 410 of similar material is engaged within an inner diameter of interlocking sleeve 409. This gamma radiation source 100 can be compressed to a reduced volume, thereby resulting in higher average density. In many applications, this shape is adaptable to 3-D printing.

FIG. 8F illustrates an embodiment of gamma radiation source 100 which is somewhat similar to that of FIGS. 7H and 8B in that a rod, tube or other extended configuration 200 of deformable iridium alloy or similar material is wrapped in a three-dimensional spiral shape so as to form a quasi-conical shape (with an open circular base) in that the rod, tube or other extended configuration 200 covers a first portion of the walls of a quasi-conical shape and a second portion of the walls of the quasi-conical shape is left open. The resulting three-dimensional spiral quasi-conical shape of the gamma radiation source 100 can be twisted or otherwise compressed into a configuration of increased average density. In many applications, this shape is adaptable to 3-D printing.

FIG. 8G illustrates an embodiment of gamma radiation source 100 wherein two adjacent disks 420, 422 each include first and second rods, tubes or other extended configurations 201, 203 of deformable iridium alloy or similar material are wrapped in a concentric spiral pattern. In the illustrated configuration, the first and second rods 201, 203 are wrapped in a clockwise configuration in first disk 420 and counterclockwise in second disk 422. The disks 420, 422 may be varied in relationship to each other, folded or otherwise compressed to vary the average density thereof. In many applications, this shape is adaptable to 3-D printing.

Other acceptable shapes may be found in PCT/US2017/050425 entitled "Low Density Porous Iridium."

Conventional prior art circular iridium disks are typically expensive to make, not only because the materials are expensive and they require extreme processing conditions, but also because half or more than half is wasted in the cutting/machining process. Waste has to be collected and recycled—duplicating time and effort. It is expected that changing from circular disks to squares or hexagons can significantly reduce the wastage associated with disk production. If ductile, deformable, compressible squares or hexagons are stacked appropriately, they could be converted to quasi-spheres by compression and/or deformation after irradiation.

The general class of compounds that are predicted to have suitable mechanical and density properties are called $L2_1$ Heusler structures. Specifically, these comprise $Ir_2M_1N_1$, where M and N represent two different metals. $Ir_2MnAl$ is described above. $Ir_2CrAl$ Is a potential alternative. There may be others, e.g., $Ir_2Al$ and $Ir_2Al^{11}B$.

With regard to the $L2_1$ Heusler compounds and structures, a range of compounds and structures should be taken into account. It is known that after irradiation of a $L2_1$ Heusler compound like $Ir_2MnAl$, it would transmute to $Ir_{2-(x+y)}Pt_xOs_yMnAl$ where "x+y" is the proportion of iridium that transmutes to platinum and osmium. There is typically approximately 5-20% conversion, depending on neutron flux, enrichment, irradiation time and decay time (burn-up/transmutation) in an irradiation. Iridium-191 (37.3% in natural iridium, approximately 80% in enriched iridium) activates to Iridium-192 of which approximately 95% decays to Platinum-192 and 5% decays to Osmium-192 over the life of the source. Iridium-193 (62.7% in natural iridium, ~20% in enriched iridium) activates to Iridium-194, which all decays to Platinum-194 in the reactor. In summary, an irradiated disk may contain roughly 5-20% platinum and 0.25-1% osmium after activation, depending on the flux, time and enrichment. It is the post-irradiated alloy that is desired to be ductile, deformable or compressible. The addition of platinum to iridium is likely to increase ductility.

Even if pre-irradiated alloy disks do not have optimum mechanical properties for source manufacture, post-irradiated disks may. Quaternary alloys that contain small amounts of other ingredients, such as, but not limited to, platinum or osmium, or other purposeful additions included before irradiation (such as, but not limited to, chromium) may improve the physicochemical and mechanical properties without activating adversely. Ternary and quaternary alloys are synthesized to account for the conversion of 10-20 atom % of the Iridium to its daughters platinum and osmium in the nuclear reactor. Representative alloys in this regard include $Ir_{1.8}$ $Pt_{0.2}MnAl$ and $Ir_{1.6}$ $Pt_{0.4}MnAl$, also including a very small percentage of osmium. A further representative alloy is $Ir_3Zr_{0.25}V_{0.75}$.

Similarly, yttrium alloyed with iridium has increased ductility. Stable, natural $^{89}$Yttrium activates with very low cross section to form a very small amount of radioactive $^{90}$Yttrium, a pure beta emitter with a 64 hour half-life. It is therefore an acceptable metal to co-irradiate with iridium. It does not produce long term interfering gamma rays. Moreover, $^{90}$Y decays to stable zirconium. Yttrium is therefore one of the preferred alloying additives. The most likely composition we would use is IrY (i.e. 50/50-atomic percent alloy), but other ratios of $Ir_xY_y$ may also have increased ductility. Further representative alloys include IrY, $Ir_{0.9}Pt_{0.1}Y$, and $Ir_{0.8}Pt_{0.2}Y$.

The density of $Ir_2MnAl$ is reported or calculated to be 13.89 g/cc vs. 22.56 g/cc for pure iridium (i.e., 61.5%). Further studies may confirm or refine this number. This is slightly higher than optimum for many applications, therefore this alloy may be used for porous or 3-D printed shapes that contain empty spaces, so that the net density may be reduced to the optimum range of 30-85% (preferably in the range of 30-70%, more preferably 40-60%), as illustrated in the various figures of this application. It is also expected that these compounds may have anti-ferromagnetic properties.

These alloys may be formed by mixing powdered elements in molar proportions, e.g. $Ir_2$+Mn+Al and heating—e.g. arc melting or using a high temperature vacuum furnace. As a variant of this basic method, it is expected, under some circumstances, to advantageously first pre-alloy Mn+Al and then mix/process this with pure iridium. MnAl melts at approximately 1500 degrees Centigrade.

Other approaches may include pre-alloying iridium and aluminum and then adding Mn or Mn+Al later. The alloy composition $Al_2Ir_3$ (i.e. 30 mol % Iridium) is reported to have a eutectic at approximately 1930 degrees Kelvin (1657 degrees Centigrade).

Reference is made to the article "Antiferromagnetism in γ-Phase Mn—Ir Alloys," as reported in the Journal of the Physical Society of Japan in 1974, pages 445-450 (Online ISSN: 1347-4073, Print ISSN 0031-9015). This article indicates that antiferromagnetic disordered γ-phase $Mn_{(1-x)}Ir_x$ ($0.05<x<0.35$) alloys exists. Mixing an Ir+Mn alloy in this composition range, e.g. $Mn_2Ir_{11}$ powder or granules with $Al_2Ir_3$ powder or granules in equimolecular proportions followed by thermal processing (arc melting or furnace) is expected to produce an alloy with a composition of $Ir_{14}Mn_2Al_2$ (=$Ir_2MnAl$).

Figure 9:
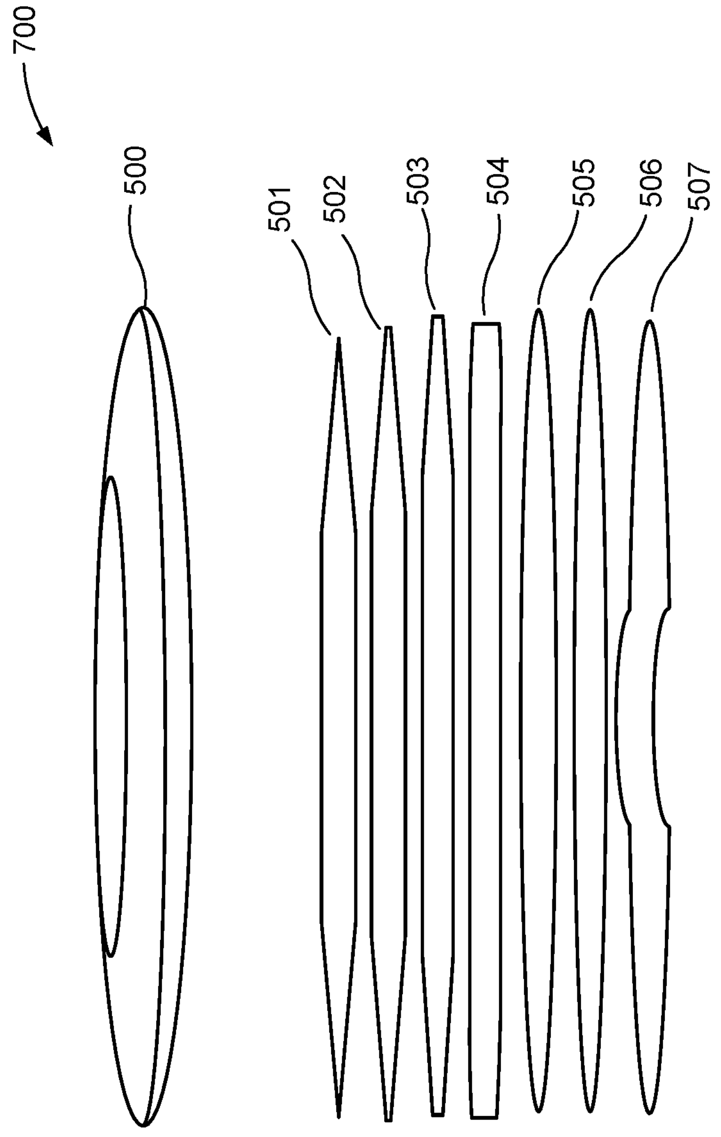
FIG. 9 illustrates a compressible disk of the second aspect of the present disclosure, along with an exploded view of a stack of these compressible disks.
Figure 10B:
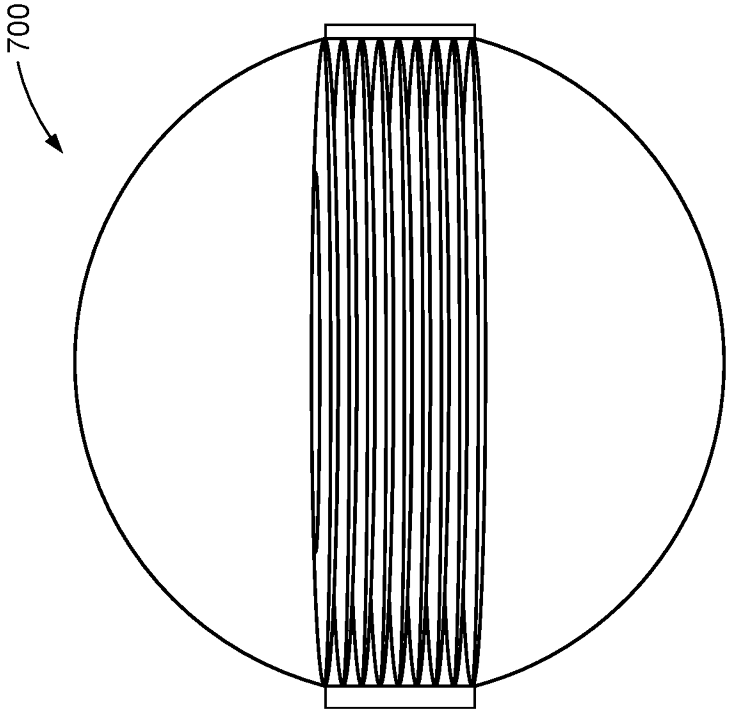
FIG. 10B illustrates a stack of compressible disks of the second aspect of the present disclosure, after compression
Figure 10A:
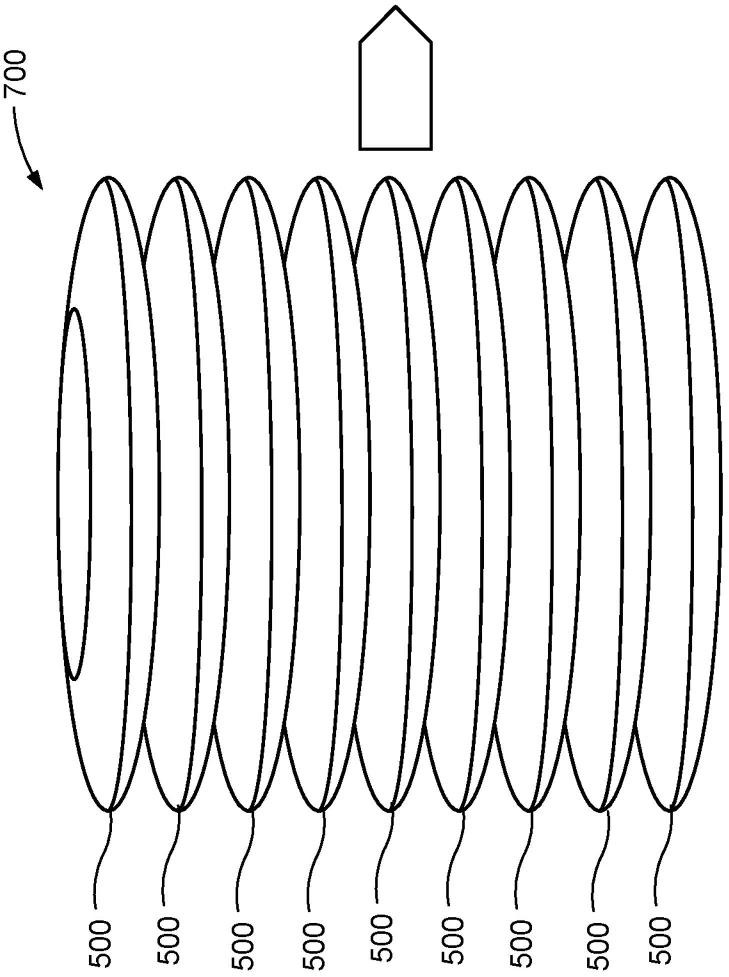
FIG. 10A illustrates a stack of compressible disks of the second aspect of the present disclosure, prior to compression.

In accordance with a second aspect of the disclosure, FIG. 9 illustrates a stack 700 of disks 500-507 of various configurations wherein the central region is thicker than the peripheral edge. Optionally, the central region of the disk 507 may have a central slightly domed shape 508 in order to provide alignment during stacking. FIGS. 10A and 10B illustrate a stack 700 of disks 500 before and after compression, respectively. FIG. 10B in particular illustrates the reduction of the volume bounding the stack 700, thereby resulting in an increased effective density or stacking density with respect to FIG. 10A, but still maintaining an effective density less than 1.0 due to the voids within the compressed stack 700, even with the material of the disks 500 themselves being as much as 100 percent iridium.

Figure 11A:
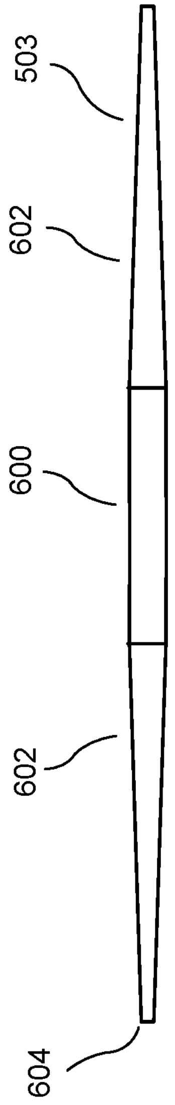
FIGS. 11A and 11B illustrate the cross-sectional views of the compressible disks of the second aspect of the present disclosure.
Figure 11B:
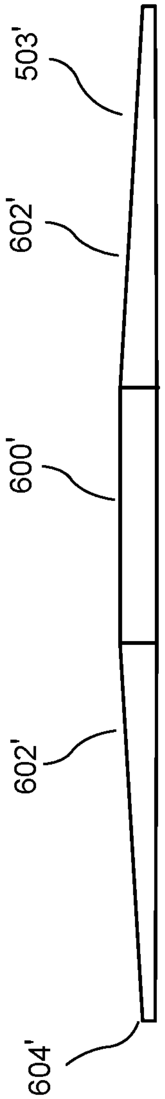

In more detail, FIGS. 11A and 11B illustrate typical shapes for disks which are envisioned to be composed of iridium (including Iridium-192) or iridium alloys of one hundred percent density within the disks themselves (in some embodiments, the density of iridium within the disks themselves may be in the range of 80 to 100 percent), but rely upon a reduced stacking density to achieve an effective reduced density within the encapsulation (see, for example, the illustrated encapsulation of FIGS. 15-18 with the reduced stacking density illustrated in at least 12A, 13D, 14A and 14B). FIG. 11A illustrates a disk 503 with a total diameter of 2.7 to 3.5 millimeters, further including a center flat region 600 of a typical thickness of 0.125 to 0.25 millimeters and a center flat diameter of 0.5 to 1.5 millimeters. The circumferential portion 602 is formed outwardly from the center flat region 600 with a thickness progressively or continuously decreasing to a thickness of 0.025 to 0.050 millimeters of a circumferential edge 604. The embodiment of FIG. 11A is symmetric about a transverse axis (i.e., perpendicular to the rotational axis) so that a lower surface of the circumferential portion 602 progresses gradually upwardly from the central flat region 600 to the circumferential edge 604'. Likewise, the upper surface of the circumferential portion progresses gradually downwardly from the central flat region 600 to the circumferential edge 604. The embodiment of FIG. 11B has similar dimensions and configurations, except that the lower surface of the circumferential portion 602' is co-planar with the lower surface of the central flat region 600' and the upper surface of the circumferential portio **602'*n* is expected to have a somewhat steeper slope than that of the embodiment of FIG. 11**A.

The thickness at the edge 604, 604' of the disk 600, 600' should be no greater than 0.5 times the thickness at the central flat region 600, 600' of the disk 600, 600'. Further, a ratio of less than 0.4142 is preferred. Otherwise, when the stack 700 is compressed and/or deformed to produce a quasi-spherical shape as described herein and shown, for example in FIG. 10B, there will be insufficient void space between disks 500 (and similar) for the compressed and/or deformed stack density to be less than eighty percent. Additionally, the force required to compress and/or deform a stack 700 of such disks (with thick edges greater than 0.5 times the thickness at the center) is expected be impractically high (i.e., disks would be too stiff to compress and/or deform). The terms "compressible and deformable" and the terms “compression and deformation” both equally apply. Within this disclosure, when one term is used, the other also applies.

Figures 12A, 12B, 12C, 12D:
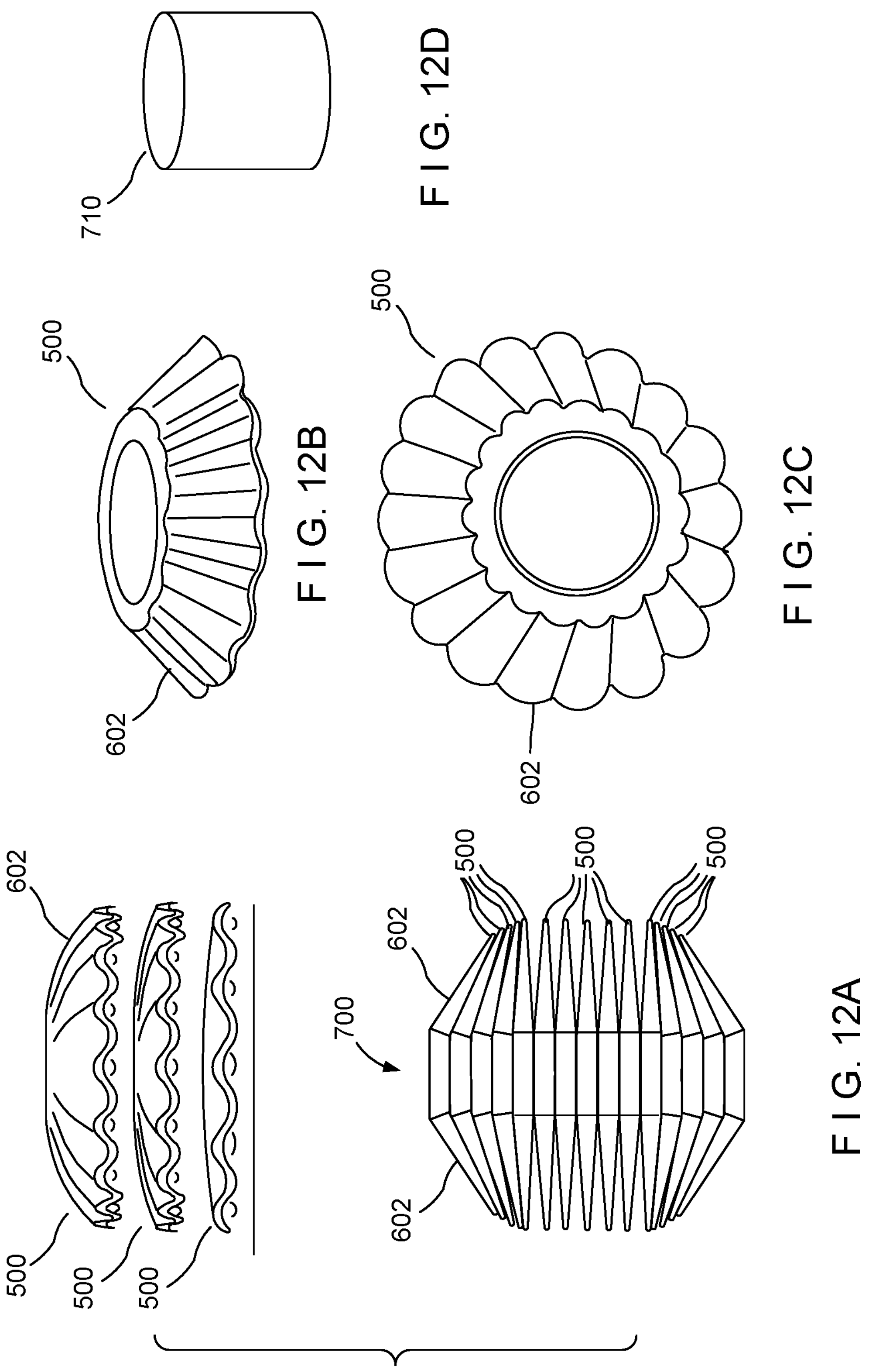
FIGS. 12A-12C illustrate the stacking and compression of the compressible disks of the second aspect of the present disclosure.
FIG. 12D illustrates a stack of 2.7 millimeter cylindrical disks.

FIG. 12A illustrates a stack 700 of the disks 500 of FIG. 11A, after the disks 500 have been compressed into a quasi-spherical shape (a “vosoid” as coined the applicants, formed by inscribing an octagon within a circle, retaining the alternating octagonal walls which form the top, bottom and vertical sides while retaining the circular portions for the remaining portions, and then rotating the resulting shape about its vertical axis, similarly, a “shiltoid” is formed by rotating an octagon about its vertical axis). The compression causes the upward or downward movement (including sagging and radially oriented fold lines, see FIGS. 12B-12C) of the circumferential portions of the disks 500. The compressed stack 700 contains a void space (and therefore a stacking density less than 1.0) and a lower density than a conventional stack 710 of 2.7 millimeter cylindrical disks but is expected to have a higher output efficiency and a shorter diagonal.

Figures 13A, 13B, 13C, 13D:
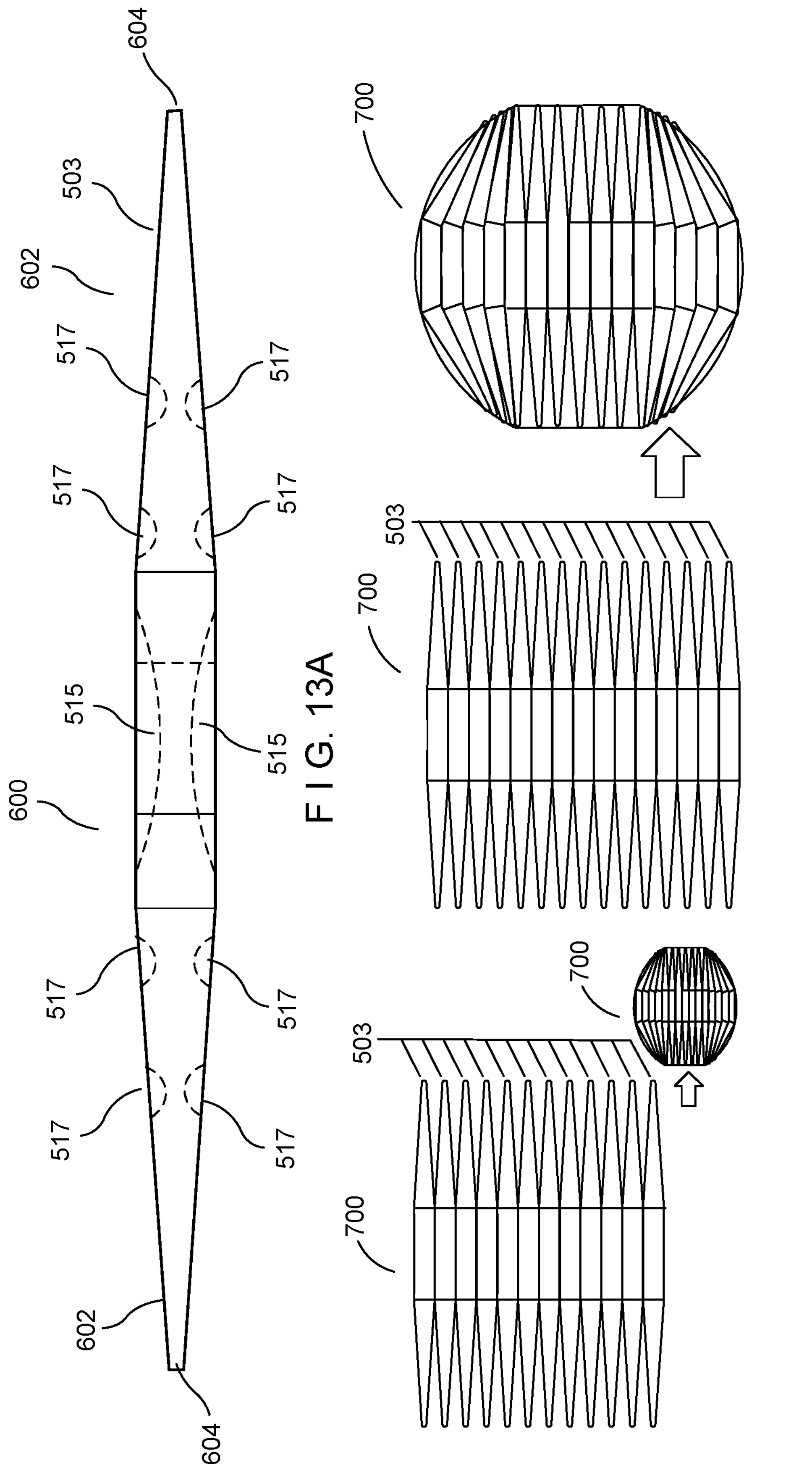
FIGS. 13A-13D illustrate a further alternative configuration of the compressible disks of the second aspect of the present disclosure.

FIG. 13A illustrates a disk 503 with a cross section similar to that of FIG. 11A, but further including concave portion 515, or even an aperture (not illustrated), in the upper and lower surfaces of the central flat region 600, and further including one or more optional grooves 517 in the upper and lower surfaces of the circumferential portion 602. The rotationally symmetric characteristics of the disks 503 is further reflected in the concave portions 515 and grooves 517. These concave portions 515 and grooves 517 may reduce mass, reduce stack density, and help the disks 503 to deform more easily during compression. The illustrated embodiment of the disk 503 in FIGS. 13A and 13D has a thickness of edge 604 of 0.04 millimeters, a mean disk thickness typically less than 0.106 millimeters (which should result in more efficient activation at edges than would result with a 0.125 mm. thick cylindrical disk), and a diameter of approximately 3.0 mm. The thickness of the central flat region 600 is 0.2 millimeters. As illustrated in FIGS. 13B and 13C, stacks of twelve or fifteen disks are expected to have a mean density (stacking density) of fifty-three percent, while the compressed configuration is expected to have a mean density of sixty-seven percent in view of the volume of the resulting quasi-spherical shape. A mean density of 30-80% is sought to be achieved, preferably in the range of 40-70%, and even more preferably in the range of 50-60%.

Figure 14B:
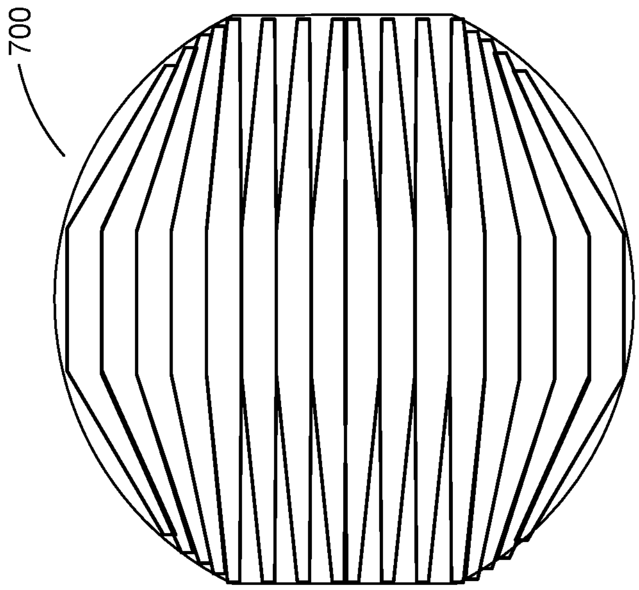
FIGS. 14A and 14B illustrate the stacking and compression of a disk of the second aspect of the present disclosure, similar to the disk illustrated in FIG. 11B.
Figure 14A:
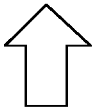
Figure 14A:
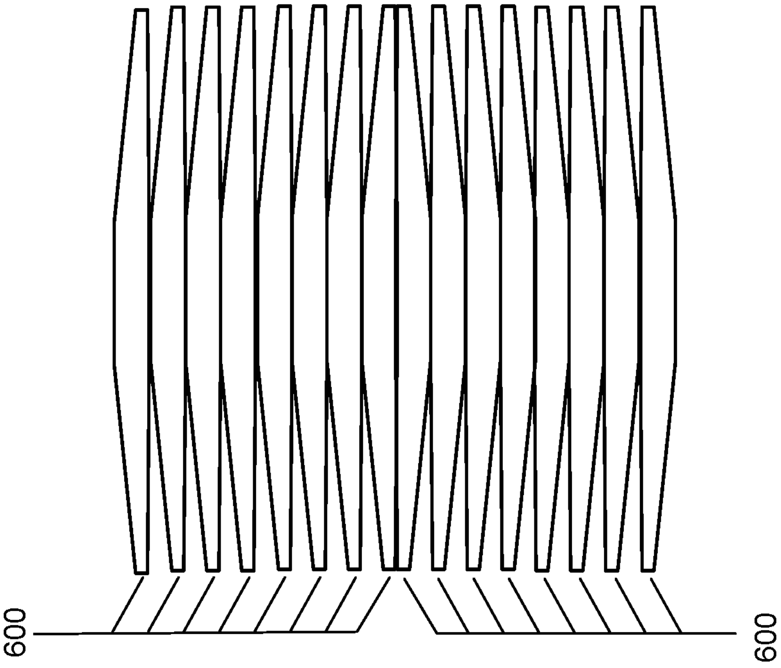

The co-planar lower surface of the embodiment of the disk 600' of FIG. 11B allows for a stack 700 to be formed as shown in FIG. 14A wherein the disks 600' on the lower half of the stack are inverted and the flat horizontal surface (in the illustrated orientation) of the disks 600' immediately above and below the center of the stack 700 can be aligned in a flush manner before and after compression.

Figure 15:
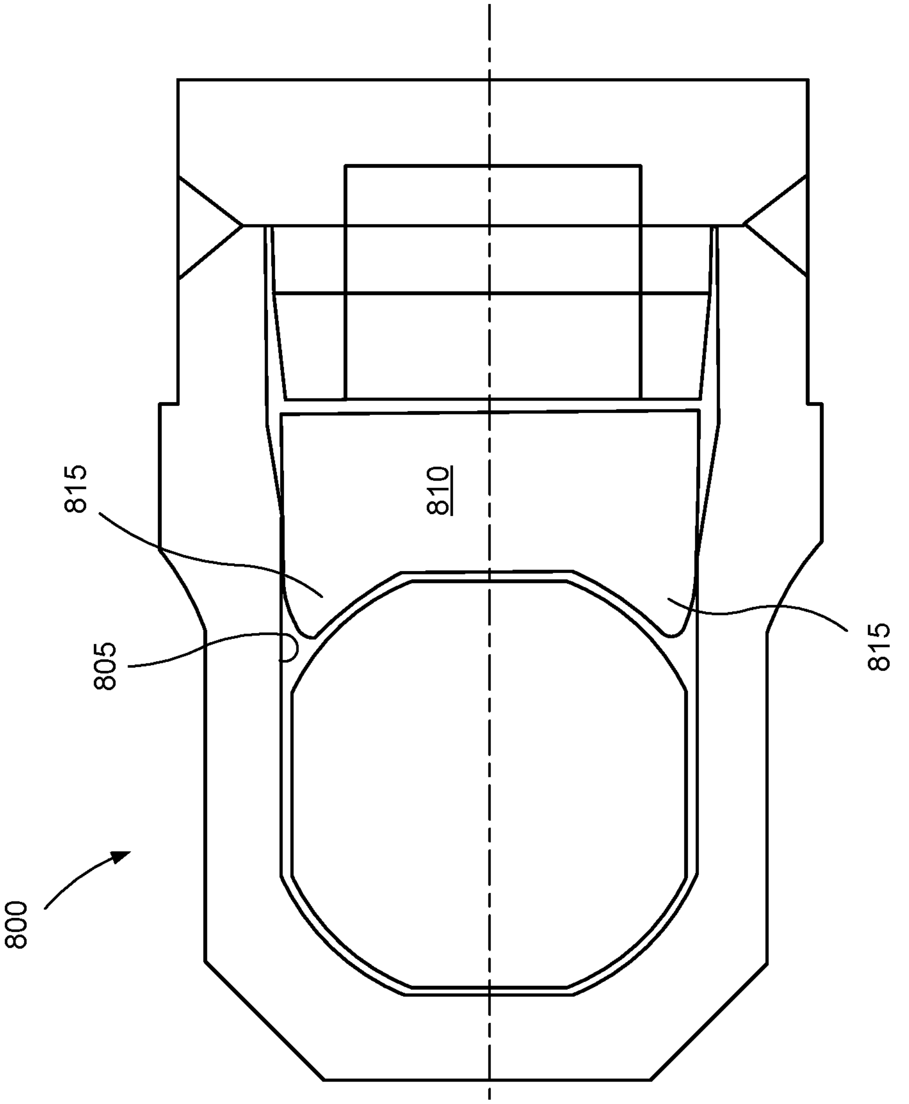
FIG. 15 is a cut-away view of a first embodiment of a configuration of an encapsulation of the present disclosure.
Figure 16:
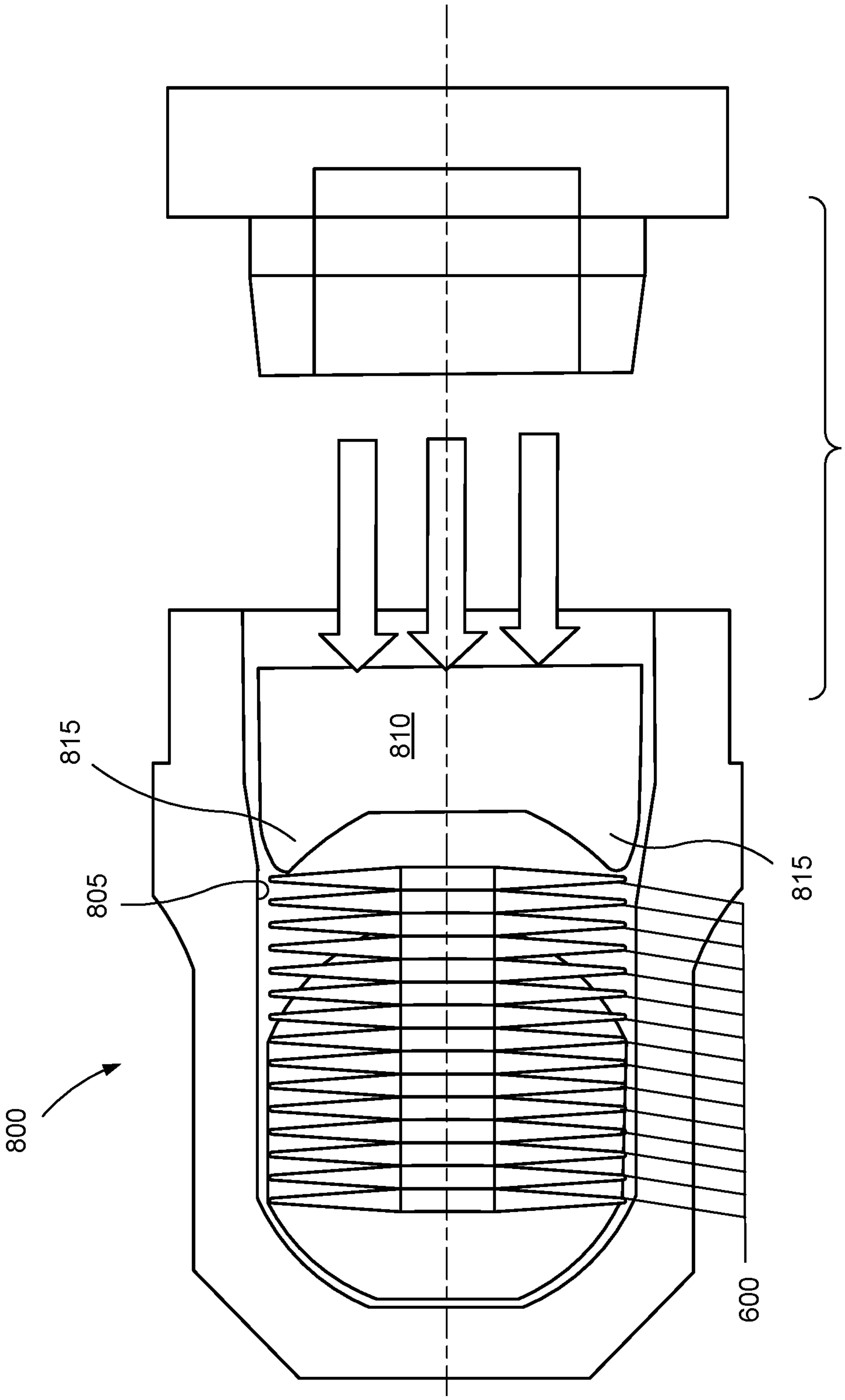
FIG. 16 is a cut-away view of an assembly method for the encapsulation of FIG. 15.

Examples of an encapsulation 800 are shown in FIGS. 15-18. In particular, FIG. 15 illustrates a first embodiment of a finished encapsulation 800 with a compressed stack 700 of disks within an internal quasi-spherical cavity 805. FIG. 16 is a partially exploded view of FIG. 15 illustrating how disks 600 (or similar) are initially stacked within the cavity 805 of the encapsulation 800, a lower plug or plunger 810 with peripheral upwardly extending forming portions 815 is urged into a force fit within the cavity, thereby compressing the stack of disks into the cavity and a lid is welded into place to maintain the position of the lower plug with respect to the compressed stack of disks and the upper outer portion of the encapsulation.

Figure 17:
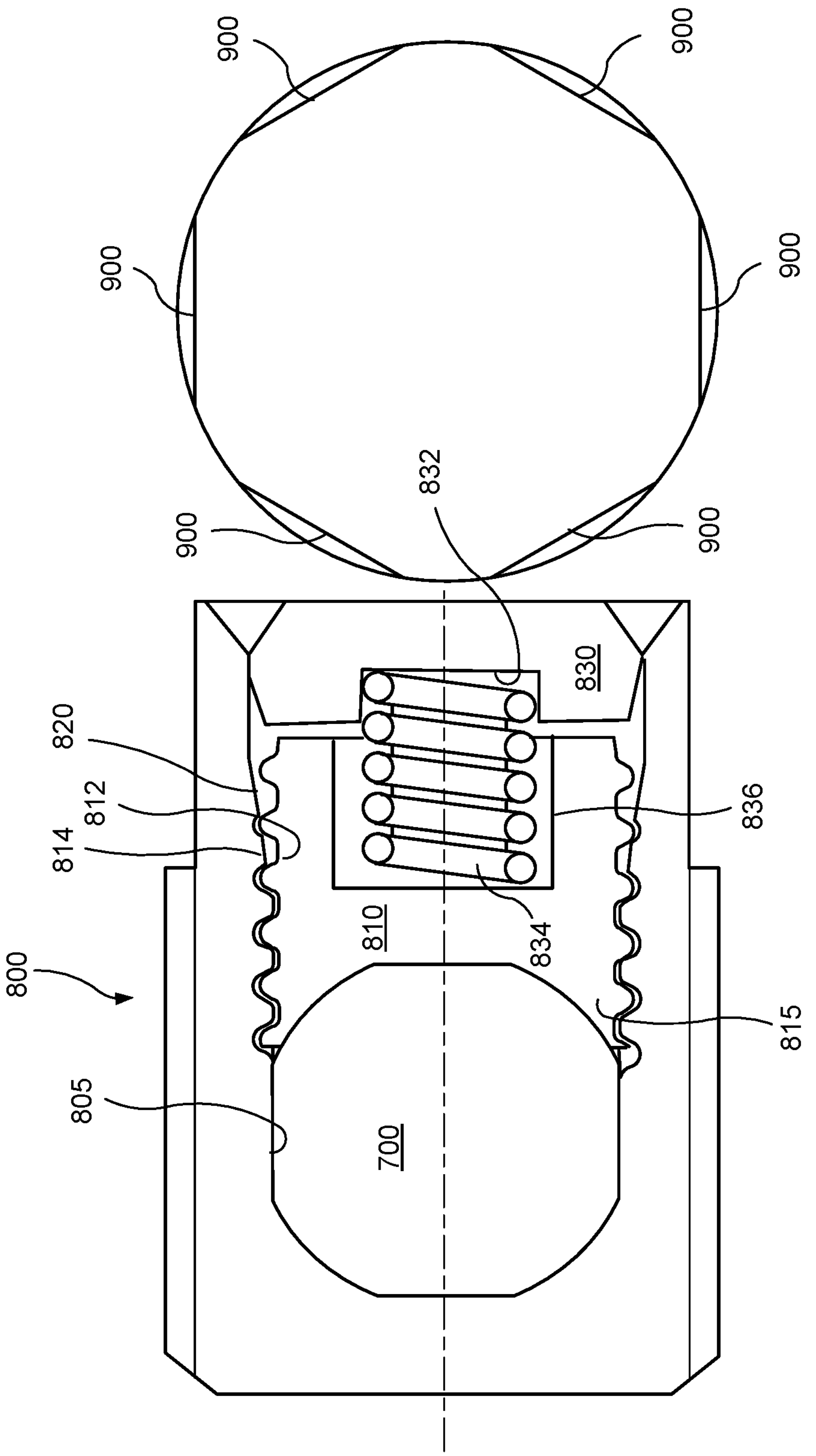
FIG. 17 is a cut-away view of a second embodiment of a configuration of an encapsulation of the present disclosure.
Figure 18:
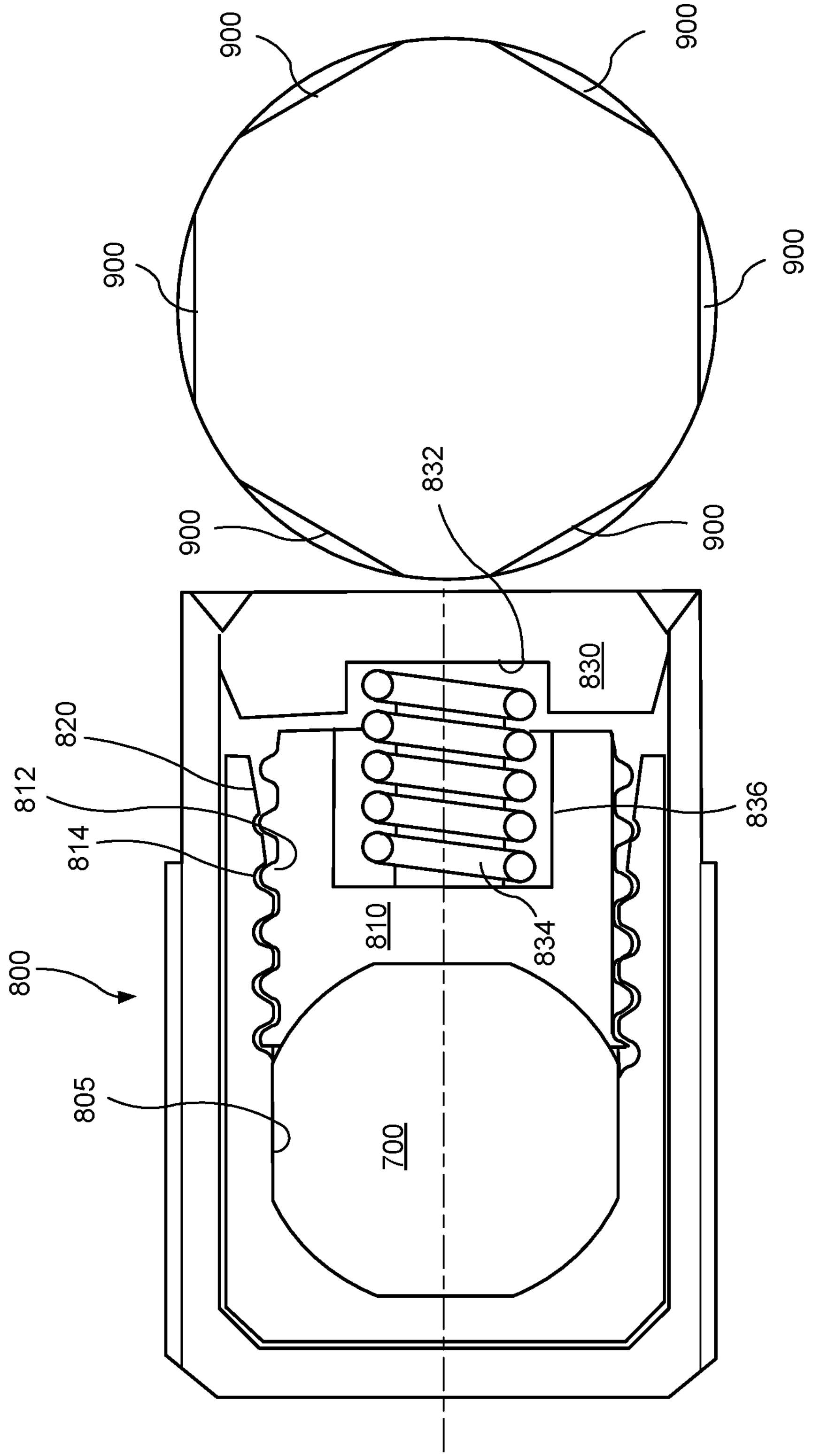
FIG. 18 is a cut-away view of a third embodiment of a configuration of an encapsulation of the present disclosure.

FIGS. 17 and 18 illustrate second and third embodiments of encapsulation 800 illustrating the plug or plunger 810 including an external thread 812 for engaging with a complementary internal thread 814 within the interior of the upper outer portion 820, thereby providing a way to exert increased forces on the disk stack 700 during the assembly process. End plug 830 includes an interior blind aperture 832 for containing spring 834 for engaging against an external blind aperture 836 of the plug or plunger 810. Spring 834 adds to the positional integrity of the encapsulation 800. As shown, the external surface of the encapsulation of the source may contain a flat or several flats 900 such as a hexagonal form to prevent the source from turning when the internal screw thread is rotated.

In summary, the radial and axial emission from such a disk stack would be expected to be enhanced relative to a stack of 100% dense iridium due to lower self-attenuation without enlarging the focal dimension of the source. Previous calculation estimated 11-17% output efficiency gain for ~60% density relative to 100% density. The percentage output efficiency gain would be lower using enriched iridium.

Such a disk stack could be compressed after activation and stacking for forming a quasi-spherical shape (vosoid or shiltoid) using shaped die plungers or a shaped capsule cavity. Such compression would reduce the focal dimension from cylindrical to vosoidal or shiltoidal. It is further envisioned that some applications may compress the disks before activation.

A standard un-irradiated iridium disk of 0.125 mm thickness could be deformed without cracking. Irradiation or activation may, in some circumstances, impact the ability to deform under compression without breaking due to neutron embrittlement during activation. In this case, disks and disk stacks may still be compressed and/or deformed, but by a mechanism of brittle fracture as opposed to ductile deformation. Weak points may be designed into the surface of disks to create fracture points or deformation points at desired locations, such as the grooves shown in FIG. 13A.

In the case of disks with a=0.8 millimeter, b=3.2 millimeter, c=0.04 millimeter, d=0.125 millimeter, the focal dimension, if pressed into a perfect voisoid or shiltoid shape using 21×0.125 millimeter disks, would be 3.47 millimeter. This is smaller than the 3.8 millimeter focal dimension of a regular stack of 21×0.125 millimeter cylindrical 2.7 millimeter diameter disks. The focal dimension of 3.47 mm is the same as a regular stack of 18×0.125 millimeter cylindrical 2.7 millimeter diameter disks.

Compression increases density, but the highest specific activity Ir-192 in the disks is expected to be in the circumference where the disks are thinnest and where neutron activation is most efficient, hence densification may not unduly decrease emission efficiency (this will need to be verified experimentally or by computational modelling).

Further, shaped disks can be mixed and matched with standard cylindrical disks, using the shaped disks at the top and bottom of conventional stacks.

Thus, the several aforementioned objects and advantages are most effectively attained. Although preferred embodiments of the invention have been disclosed and described in detail herein, it should be understood that this invention is in no sense limited thereby.

What is claimed is:

1. A radiation source including a stack of disks containing iridium or an iridium alloy of 100 percent density wherein the stack contains spaces between adjacent disks thereby reducing the average stack density in the range 30-85% of the density of 100% dense pure iridium wherein the disk stack is subsequently compressed, deformed or worked after irradiation to form a quasi-spherical shape inside a source capsule.

2. A radiation source of claim 1 comprising:

a plurality of stacked disks, the disks including Iridium-192, the disks having a center and an edge, wherein the center is thicker than the edge;

wherein the average stack density prior to compression, deformation or working is in the range of 30-80 percent.

3. The radiation source of claim 2 wherein the average stack density prior to compression, deformation or working is in the range of 40-70 percent.

4. The radiation source of claim 2 wherein the average stack density prior to compression, deformation or working is in the range of 50-60 percent.

5. The radiation source of claim 2 wherein material of the disks is 80 to 100 percent iridium.

* * * * *